United States Patent
Parsonnet et al.

(10) Patent No.: US 11,755,622 B1
(45) Date of Patent: Sep. 12, 2023

(54) MULTIVARIATE DATA PROCESSING

(71) Applicant: Seeq Corporation, Seattle, WA (US)

(72) Inventors: Brian Parsonnet, Fort Collins, CO (US); Eric K. Parsonnet, Oakland, CA (US); Aswin Nataraj Venkat, Belmont, CA (US)

(73) Assignee: Seeq Corporation, Seattle, WA (US)

( * ) Notice: Subject to any disclaimer, the term of this patent is extended or adjusted under 35 U.S.C. 154(b) by 464 days.

(21) Appl. No.: 16/782,857

(22) Filed: Feb. 5, 2020

Related U.S. Application Data (60) Provisional application No. 62/801,274, filed on Feb. 5, 2019.

(51) Int. Cl.
*G06F 16/28* (2019.01)
*G06F 16/22* (2019.01)

(52) U.S. Cl.
CPC .............................. *G06F 16/285* (2019.01); *G06F 16/2264* (2019.01)

(58) Field of Classification Search
CPC .......................... G06F 16/2264; G06F 16/285
See application file for complete search history.

(56) References Cited

U.S. PATENT DOCUMENTS

| | | | |
|---|---|---|---|
| 6,629,097 B1* | 9/2003 | Keith ................. | G06F 16/9558 715/848 |
| 9,336,302 B1* | 5/2016 | Swamy ............... | G06F 16/248 |
| 11,023,440 B1* | 6/2021 | Gupta et al. ........ | G06F 16/9024 |
| 11,036,764 B1* | 6/2021 | Zelenov et al. ...... | G06F 16/906 |
| 11,562,002 B2* | 1/2023 | Pallath et al. ....... | G06F 16/2465 |

OTHER PUBLICATIONS elsevier_enhanced_Reader (Year: 2000).*

* cited by examiner

*Primary Examiner* — Eddy Cheung
(74) *Attorney, Agent, or Firm* — Polsinelli PC (57) ABSTRACT

The effective dimensionality of multivariate data can be reduced while minimizing loss of fidelity to primary calculations of interest. The reduced dimensionality may simplify analysis and make it more computationally efficient as a result of the simplification. Boundaries along a subset of dimensions may be identified and used to effectively reduce the dimensionality of the data according to those boundaries.

25 Claims, 7 Drawing Sheets

MULTIVARIATE DATA PROCESSING

CROSS REFERENCE TO RELATED APPLICATION

This application is related to and claims priority under 35 U.S.C. § 119(e) from U.S. Pat. Application No. 62/801,274, filed Feb. 5, 2019 entitled "Multivariate Data Processing," the entire contents of which is incorporated herein by reference for all purposes.

TECHNICAL FIELD

Aspects of the present disclosure relate to performing transformations on streaming and static datasets.

BACKGROUND

Multivariate models of sensor or time-series data are commonly used to measure performance of systems. However, these can have limited utility for complex systems, due to high dimensionality and the uncontrolled nature of the inputs, among other things. More particularly, it is common to measure aspects of systems and physical assets using sensors, observations, and calculations. Examples include medical readings in an emergency room, the dashboard of a car, a "black box" in an airplane, the HVAC and security system for a facility, stock market transactions, a control system in an industrial process plant, or a regional energy grid. An emergency room patient may have a handful of sensors; a car, building, airplane, stock exchange, industrial plant, and energy grid may have tens, hundreds, thousands, tens of thousands, hundreds of thousands, or tens of millions of measurements, respectively. Measurements may be continuously observed and then discarded, or stored for future reference. Such storage can take many forms, but is commonly stored as date-time / measure pairs of values (e.g., key-value pairs), and referred to as a time-series. Key-value pairs, however, can be keyed with any dimension, not just date-time. A series, for example, could use distance, angle, or any other measure as the key, yet the same tools and concepts apply naturally. Key-Value pairs may be stored at a regular period (e.g., every minute), only when the value changes, only during noteworthy events, or according to countless other possible criteria, alone or in combination. Calculations, visualizations, and analytics can be performed on the stored datasets, or on the new data "streaming" as it comes in, either in isolation or in conjunction with other datasets for added context or information. The results of such data processing have been used for the purposes of control, optimization, monitoring, diagnostics, maintenance, production accounting, scientific discovery, financial accounting, and countless other purposes.

A common application for analyzing series data is to look for changes or discrepancies in behavior. Changes or discrepancies may be found by comparing actual values to "first principle" calculations or models, where a priori knowledge of the system, the underlying engineering and/or science can define a basis for normal or abnormal behavior. For example, if a car is in third gear, the velocity should be some known fixed multiplier of the engine revolution per minute (RPM). Changes might also be identified using expert rules, where human knowledge of the system leads to defined limits. For example, if the engine temperature exceeds 1000° F., then it is likely that there is a problem. Changes might also be detected by comparing values to historical norms, which is an empirical approach. For example, a driver might usually get 22 miles per gallon (MPG) on the highway; however, one particular day the driver instead attains only 15 MPG. Each of these methods (first principle, expert, or empirical) can be quite involved, looking at a wide variety of statistics and relationships, and can be based on the raw time-series data, or on transformations, aggregations, calculations, and combinations. Most conventional analytic systems use a combination of these techniques.

One area of difficulty occurs when a system has multiple behaviors, either controlled or uncontrolled, that can interfere with training or reliability of a model or approach. For example, the range of conditions can vary wildly and may render comparisons and models uselessly inaccurate. The problem is especially acute in complex industrial processing plants, where aspects of the systems being measured are constantly changing or there are a large number of dimensions (e.g., signals, attributes, characteristics, etc.). In such environments, equipment, human operators, weather, recipes, operating targets, control algorithms, equipment condition, materials, control set points, and sensor accuracy may all be in a flux. Moreover, such systems are often also under-sensed. For example, there may be more degrees of freedom in the system than there are sensors. In such a situation, making accurate performance calculations can be analogous to solving an equation with four variables and five unknowns - there may be no single answer.

Machine learning and other big data approaches have been developed which use multidimensional clustering, regression, neural networks, random forests, etc., largely for empirical modeling in order to detect or predict changes in the behavior of a system. However, machine learning and big data approaches can be prone to false positives and/or false negatives. Further, true positives may often be obvious to a subject matter expert (SME), and therefore be of little inherent value. Additionally, traditional approaches often may struggle with under-sensed, or inconsistently sensed, data.

Attempts to create models that attend to the mode of operation struggle as well, because the accuracy of modal information may be insufficient, and undefined sub-modes and transition modes can still overwhelm analysis. Other approaches which look only at "steady state" may encounter processes that defy a usable steady state time period, and by definition, steady state analysis will readily overlook anomalies that occur during transition periods. Other approaches can identify that something has changed, but lack specificity, and are therefore difficult to act upon. Another approach would be a neural network model, which in theory could model the various regimes (modes); but in practice, these systems are sensitive to ever-changing environments, and retraining and/or building network architectures to address that change requires highly specialized skills and exceptional amounts of time. Another approach would be to reduce the dimensionality through dimensionality reduction techniques such as, for example, Principle Component Analysis (PCA), Linear Discriminant Analysis (LDA), etc., where redundant information is consolidated, but the new reduced dimensions may require a shift in perspective, often not intuitive or easy to visualize, and the datapoints in the model output are modified from the original input dataset.

It is with these observations in mind, among others, that various aspect of the present disclosure were conceived.

SUMMARY

A method for discovering data relationships across highly dimensioned data includes separating a n-dimensional space into a first set of dimensions (A) and a second set of dimensions (B), the n-dimensional space including multiple dimensions (n) and describing an n-dimensional dataset (N) wherein A and B are subsets of the multiple dimensions (n), and selecting a subset (S) of the original dataset N, the selection based on constraints in set A, the constraints reducing degrees of freedom of S, wherein S maximizes a quantity of desirable characteristics over dimensions in set B.

The method may include A and B being predetermined.

The method may include A and B being determined automatically.

The method may further include determining a tradeoff between the constraints and the quantity of the desirable characteristics in B, wherein the determination is one of an automated process, a manual process, or a combination of automated and manual processes.

The method may include expanding one of N or S through additional transformations of the dataset.

The method may include S being defined for ordered data and membership of a datapoint within S being one of qualified or disqualified by membership of adjacent points in one of a sequence or clusters.

The method may include qualifying or disqualifying membership of the datapoint within S being based on user input.

The method may include S being selected by a clustering algorithm operating over dimension set A.

The method may include S being parametrically adjusted to relax or tighten various aspects of the constraints.

The method may include S being constrained by a definition to include at least a set of pre-selected characteristics.

The method may include the maximized quantity of desirable characteristics being quantified, in whole or in part, by one of a count, a weighted or unweighted distribution, a user-defined statistical measure, or an extent of the dataset.

The method may include the degrees of freedom being quantified by a function of one of a localization of datapoints, a size of clusters, or a location of clusters.

The method may include the function further including weighting.

The method may include parameters of the function being adjusted by one of an automatic process, a manual process, or a combination of automatic and manual process.

The method may include at least one dimension of B being measured in units of time.

The method may include multiple subsets of the original dataset being selected, each of the multiple subsets separately evaluated for desirable characteristics in B.

The method may include the desirable characteristics being inclusive of an entirety of S.

The method may further include transforming the definition of S to execute optimally in a separate system.

The method may further include providing S to a downstream process.

The method may further include the downstream process including one of a modeling process or an analysis process.

The method the downstream process including a visualization process, and wherein S is visualized over dimensions B and dimensions A are not articulated by the visualization process.

The method may include S being defined through one of an iterative or programmatic determination process.

The method may include S being defined for the dataset N and wherein the method further includes storing the definition of S on a memory for application to one of the dataset N or another dataset.

A system for discovering data relationships across highly dimensioned data includes one or more processors, and a memory comprising instructions to separate a n-dimensional space into a first set of dimensions (A) and a second set of dimensions (B), the n-dimensional space including multiple dimensions (n) and describing an n-dimensional dataset (N) wherein A and B are subsets of the multiple dimensions (n), and select a subset (S) of the original dataset N, the selection based on constraints in set A, the constraints reducing degrees of freedom of S, wherein S maximizes a quantity of desirable characteristics over dimensions in set B.

A non-transitory computer readable medium, when executed by one or more processors, causes the one or more processors to separate a n-dimensional space into a first set of dimensions (A) and a second set of dimensions (B), the n-dimensional space including multiple dimensions (n) and describing an n-dimensional dataset (N) wherein A and B are subsets of the multiple dimensions (n), and select a subset (S) of the original dataset N, the selection based on constraints in set A, the constraints reducing degrees of freedom of S, wherein S maximizes a quantity of desirable characteristics over dimensions in set B.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Aspects of the present disclosure involve a methodology to reduce the effective dimensionality of data, such as data for a multivariate model, to simplify analysis while also minimizing loss of fidelity to the model computations. In this regard, one aspect of the disclosure involves defining a search criteria for a dataset of datapoints, where each datapoint is a collection of multiple coordinate values within multiple signals (e.g., multiple sensor readings over a period of time, etc.). For example, a dataset may be MPG values over time of multiple different vehicles where each data point in the dataset includes values such as time, vehicle make, passenger count, octane rating of gas, weather conditions, location information, etc. The search criteria may define a subset of the dataset where, for example, the variability within the subset is reduced, or eliminated, along one set of signals, while another set of signals retains desirable characteristics. For example, coordinates along an axis associated with a particular signal (e.g., a dimension) may be effectively constrained by reducing variability (and thus the dataset) along that axis. Further, other statistical measures besides variability may be used to define the subset of the dataset (e.g., skew, scedasticity, etc.). Creating a subset by down-selecting datapoints from the original dataset based on applying constraints (e.g., selecting for certain values, or value windows, or points within a contour) along one or more axes may be desirable for analysis. Application of constraints is broadly envisioned. For example, constraints may be applied to signals as-is or to a refactoring or transformation of those signals such as, for example and without imputing limitation, constraining the standard deviation over a sliding time window.

In some examples, there may be a trade-off in meeting competing objectives of reduced variability, in the subset, and retention of desirable characteristics, of the subset. For example, by more narrowly constraining the variability of a first set of signals, desired characteristics of a respective second set of signals in the dataset may be destroyed or diminished. In effect, there may not be enough variability over the desired remaining dimensions to extract useful information out of the respective datapoints. On the other hand, widening constraints, and thus increasing variability along constrained axes, may also be detrimental to analytical value of the selected subset because the degrees of freedom, or effective dimensionality, of the data is not sufficiently reduced. One aspect of this disclosure relates to managing this tradeoff.

Another aspect of the methods disclosed herein is that a search can be defined separately from application of the search. As a result, the search can be applied to any, or substantially all, of the original dataset, an ever-growing (e.g., streaming) dataset, or an altogether new dataset. Historical data (e.g., log data, historical datasets, etc.) is used to generate constraints for application of the search and also to infer state. Thus, the disclosed methods may have the added advantage of accounting for under-sensed data, such as in an industrial setting, by enabling searching for occasions in the historical data representing similar sets of conditions (e.g., for determining estimates) where a target value or relationship is expected, even when sensor data is otherwise incomplete.

The following is an example of processing a dataset for vehicle performance, and is set out for explanatory purposes only and not to be taken as imputing limitation. Consider a model that analyzes a computed value of instantaneous MPG of an automobile to determine how MPG performance changes over time. The raw data of instantaneous MPG for the car as an input to the model may provide an inaccurate, ambiguous, and/or incorrect result because the MPG performance may be affected by differences as result of changes in speed, acceleration patterns, passenger count or other load differences, wind, elevation, terrain, gas octane, etc. To account for conditions that effect MPG performance, data needs to be collected and, according to the present disclosure, managed to reduce the complexity of the applying the data while at the same time maintain the useful attributes of the data so that MPG performance over time may be meaningfully obtained from the model.

However, restricting application of the model to only data gathered during a small number of selected conditions, such as only when driving with a narrow range of speeds (e.g., 55 - 70 while highway driving), with a set number of people and other loading (e.g., one person and no load), in conditions with wind less than 5 MPH, for example, may likewise be ineffective because such conditions happen rarely and are thus of limited analytic value. Instead, a set of conditions may be found that occur with a sufficient frequency and duration for MPG to be meaningfully compared along like-to-like conditions.

In the context of this example, selecting a substantially narrower range than is present within the original dataset for each of speed, acceleration, passenger count, wind, elevation, inclination, and octane may effectively reduce dimensionality of a respective remaining subset of datapoints, essentially removing respective sensors from factoring into downstream processing and analysis. However, a casual selection of these data values and respective ranges (e.g., search criteria), might result in a subset of the data that, in combination, never actually occurred, occurred to infrequently, occurred to sporadically, or the like, to be run in the model to generate an accurate output.

An analytically viable distribution of the data over time may be preserved with a particularly defined set of narrow ranges. For example, the dataset may include data showing that the car frequently traveled over 30 miles per hour, with little or no acceleration, with only the driver, no wind, at an elevation between 2000 and 2100 feet, up a 1% grade, and with 89 octane 250 times in the last year, roughly 5 times per week. In this example, a datapoint includes the dimensions of time, speed, acceleration, passenger count, location, wind speed, octane rating, etc., and the values for each dimension along multiple datapoints are used to generate observations as set out immediately above. As a result, the 250 datapoints may be used to analyze the MPG both under effectively constant conditions and over a meaningful span of time.

Another example may include analysis of flow and valve position during constant (or effectively constant) pressure, temperature, and viscosity. In this case, flow and position may be distributed over some narrowly defined pressure, temperature, and viscosity (rather than referencing datetime). It is understood that the examples presented are simplified for purposes of clarity and understanding and that, in real-world situations, datasets are likely to be considerable more complex (e.g., higher-dimensioned) than as described above. For example, in an industrial plant, the situation may be considerably more complex, and typically beyond the reach of human intuition to define a useful search criteria and identify a useful subset of datapoints for any given computational model to which the datapoints will be applied to produce what result the model is intended to produce, though the same principles may apply.

The following describes one example of a method of constraining a selection of datapoints within a dataset based on applying dimensional constraints according to performance of said constrains. For a dataset representing N-dimensions, the N dimensions may be split into two (2) groups of dimensions A and B, through either a manual process (e.g., by a SME, etc.) or an automatic process (e.g., random exploration, etc.). The values, coordinates, etc., of the various dimensions in A may be constrained in order to reduce the effective degree of freedom in what remains as a subset of the dataset while maintaining desirable characteristics over the dimensions of B.

Figure 1A:
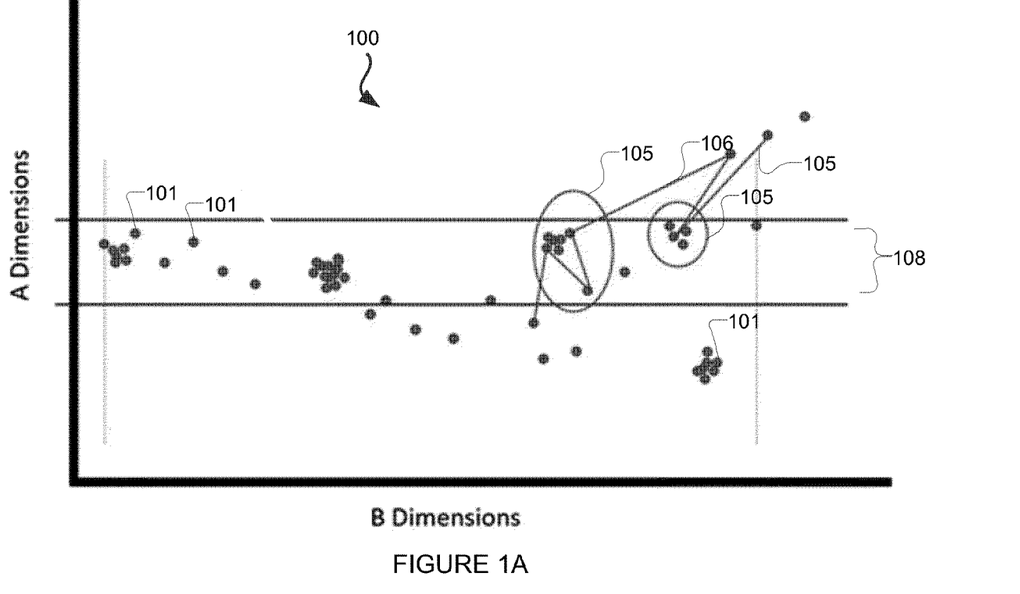
FIGS. 1A-F depict datapoints plotted over a process selecting dimension subsets, according to some embodiments.

Nominally, any given datapoint in the dataset may have a value (or coordinate) in each of the N dimensions. Selecting a subset over one dimension, or group of dimensions, also selects corresponding points in the other dimensions, as depicted by FIG. 1A. In particular, FIG. 1A depicts a plot 100 showing dimensions A plotted against dimensions B. Plot 100 includes datapoints 101, some of which are bounded in area 108. Portions of datapoints 101 are grouped in clusters 105 and, further, distances 106 are charted between some of datapoints 101. In general, FIGS. 1A-F, 3, and 4 are provided to highlight and clarify underpinnings of certain concepts and methods disclosed herein. Accordingly, FIGS. 1A-F, 3, and 4 are to be understood to be explanatory only and should not be taken to impute undue limitation.

Selecting a subset over one dimension also effectively reduces the degrees of freedom of the resulting data subset, which may provide analytical advantages. One advantage in particular is that with sufficient reduction in the degrees of freedom, the resulting subset can be treated as having reduced dimensionality. The disclosure now turns to a discussion of how to constrain over one set of dimensions while maintaining desirable characteristics of what remains.

Ideal "desirable characteristics" may include that the remaining datapoints (e.g., a subset of the dataset) be statistically identical in B dimensions to the statistics for B dimensions for the full (e.g., original) dataset. However, this may be impractical in some examples. Accordingly, while the specific desirable characteristics may vary, a subset of the dataset may be selected such that the subset is effectively described by (A- r) + B dimensions, where r is a measure of the reduction in degrees of freedom, and the desirable characteristics along the B dimensions are satisfied. Such desirable characteristics may include, as clarifying examples and without imputing limitation, the range, distribution, or statistics describing points over the domain (including median, mode, quartiles, variance, etc.), with sufficient remaining volume to support hypothesis testing, modeling, and analytics. If some of the dimensions are ordered, other statistics may also be significant, such as frequency analysis, autocorrelation, cross correlation, etc.

Desirable characteristics of B, or of the full subset S, may differ from the original dataset N. For example, the original data set may exhibit an uneven distribution across dimensions B, but the selected subset can be more evenly or advantageously distributed.

The tradeoff between constraining the domain in A dimensions while retaining desirable characteristics over B dimensions, or over the complete remaining subset, may be advantageously served by having quantitative measures for the statistics of A and B. Further, the remaining subset may be defined to benefit from a parameterized approach and so be readily described and manipulated.

The definition of the subset of data may be described by boundaries in A-dimensional space, where a geometry specifies shape, size, and/or placement of an A-dimensional boundary. The boundary may also specify a disconnected subset. Returning to FIG. 1A, A has just one dimension, and the boundary is a pair of straight lines defining area 108.

Figure 1B:
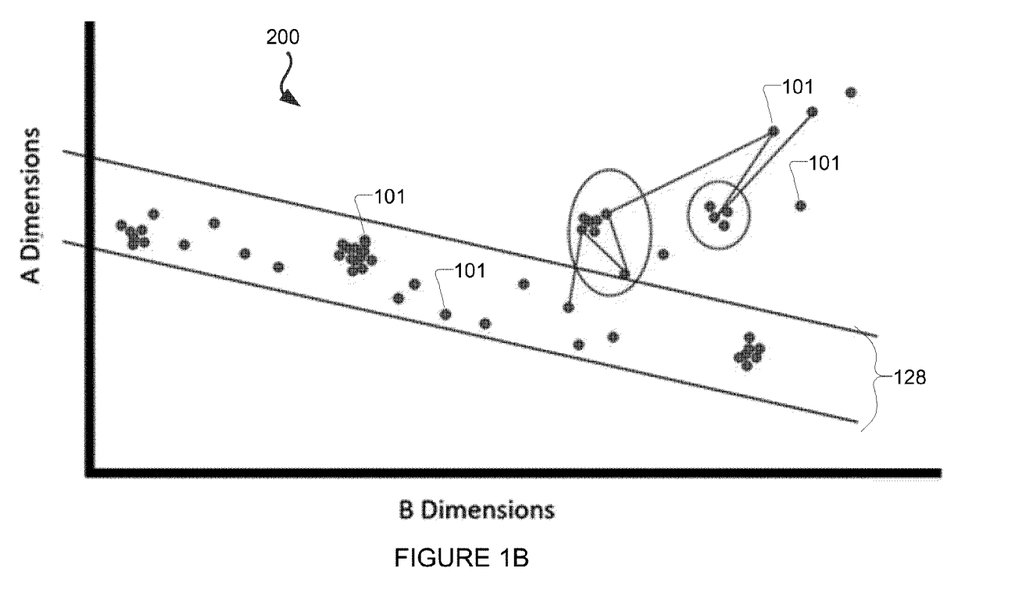

In some examples, boundaries in A may be defined as functions of dimensions of B, allowing for, as depicted in FIG. 1B, linear boundaries to be angled relative to individual dimensions. In particular, FIG. 1B depicts a plot 120 which is reflective of plot 100 discussed above. Plot 120, however, is a transformation angling linearly bounded area 108 to generate an area 128 angled relative to dimensions of dimensions B using the same datapoints 101 of plot 100 (and, accordingly, the same or substantially similar clusters 105 and distances 106) as discussed above. Nevertheless, boundaries may be any arbitrary shape, such as, for example, circles, ovals, arbitrary lassos, triangles, etc., or their multi-dimensional and hybrid equivalents.

Figure 1C:
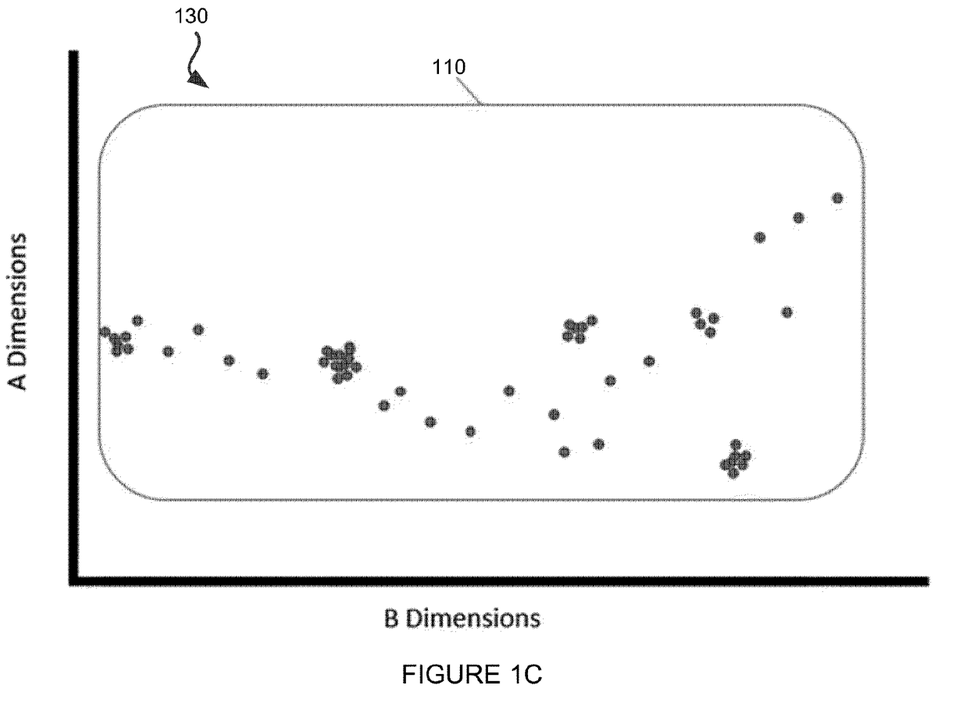
Figure 1D:
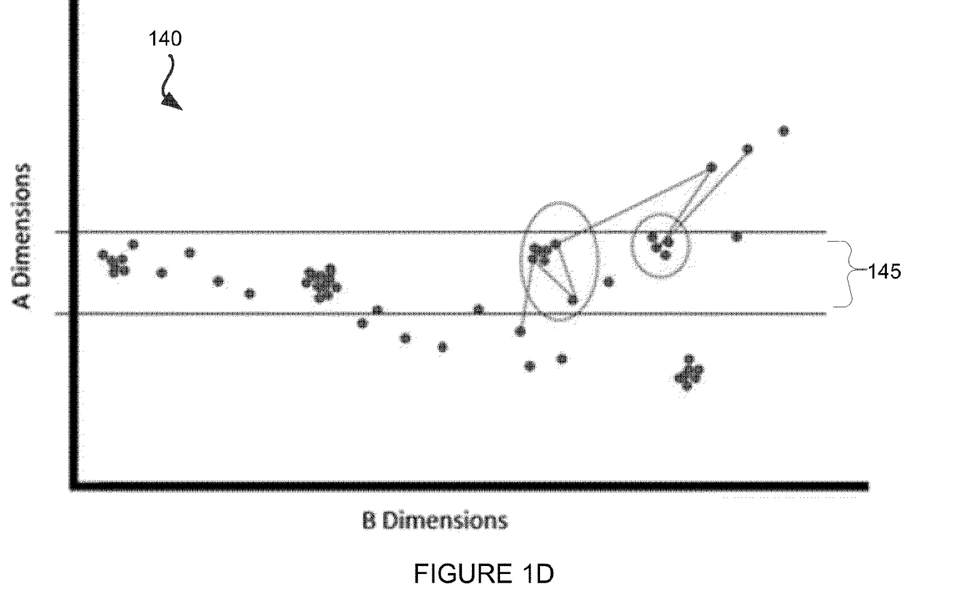
Figure 1E:
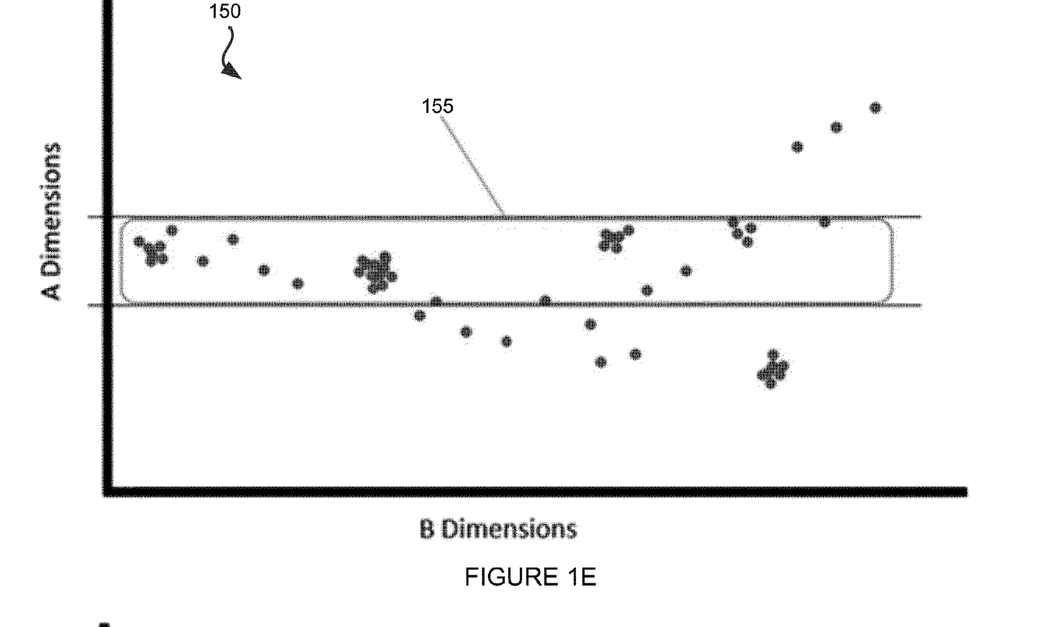
Figure 1F:
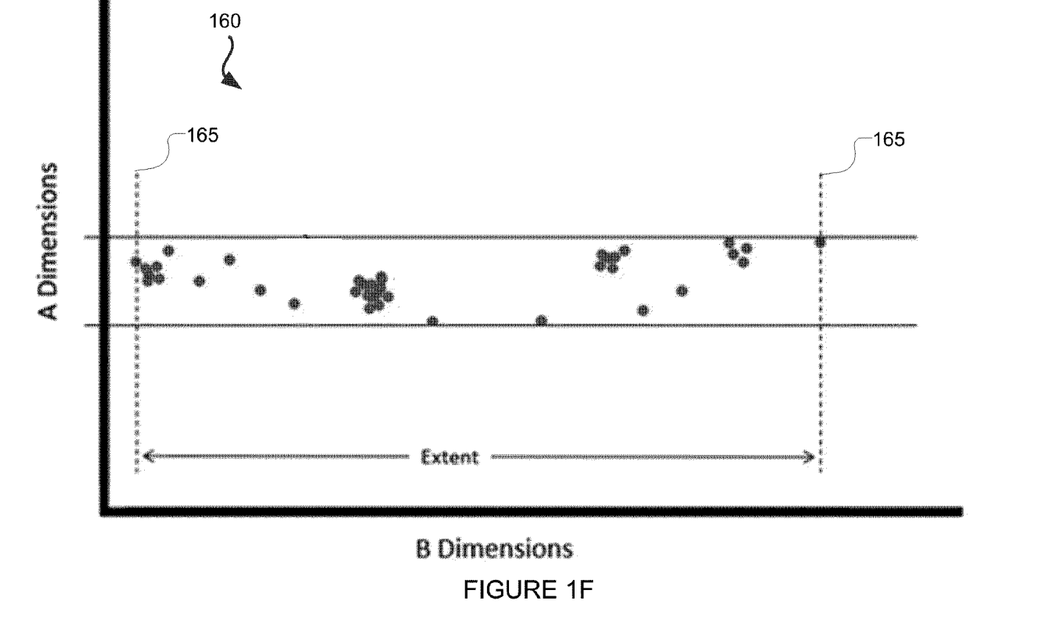

Quantitative measures for resulting data subset S can be determined for any or all of the original N dimensions, but the more common interest may be as applied to the subset over B dimensions. FIG. 1C depicts a plot 130 of dataset N 110. In particular, data N 110 is plotted over dimensions A and B. FIG. 1D depicts a plot 140 in which boundaries defining bounded area 145 are applied to generate a data subset S, as depicted in FIG. 1E depicting plot 150. In particular, plot 150 includes a defined subset S 155. Having selected subset S 155, FIG. 1F depicts a plot 160 in which datapoints falling outside bounded area 165 are ignored. Quantitative measures of subset S 155 are then applied.

The quantitative measures may include, for example and without imputing limitation, any combination of extent (e.g., range) of the datapoints within the subset S, distribution of the datapoints within the subset S, distribution of clusters of data points within the subset S, distribution cluster sizes of datapoints within the subset S, number of points within the subset S, etc. As depicted in FIG. 1F, for example, extent is defined by range boundaries 165. In examples where dimensions are ordered (e.g., where any given point has adjacent points within a respective ordered dimension), quantitative measures may additionally and/or instead include, for example and without imputing limitation, whether or not adjacent points fall within the boundaries, whether or not clusters containing adjacent points fall within the boundaries, and the like.

The quantitative measures are broadly imagined and will be understood by a person having ordinary skill in the art to encompass a variety of examples. As an explanatory example, where an even distribution is sought, an ideal distribution may be akin to distribution of weight across a physical metal rod. A moment of inertia for such a rod can be calculated about a fulcrum placed at any point, and the distribution of weight in the rod may be represented as the moment of inertia as a function of the placement of the fulcrum. Using standard physics equations, the moment of inertia for a perfect rod as the fulcrum moves across the rod would be a parabola. A similar model can be used to quantify a distribution of points across some dimension. For example, individual datapoints and their respective locations along respective dimensions may be treated in a similar fashion as to that of mass and position along the rod discussed above. Thus, as with an ideal physical rod and a moving fulcrum, a moment of inertia calculation may be used to provide a measure of datapoints based on an ideal parabola. It is understood that evenness is one example and that any arbitrary statistical measure or calculation can be similarly used.

Expanding on the above notion for evenness of distribution, the moment of inertia may be calculated by Moment of Inertia = Sum( $M_i * R_i^2$ ), for discrete masses, and Moment of Inertia = $\int x^2 \, dm$, for a continuous distribution of mass. Further, these equations can be modified to better measure the datapoints in a subset, such as, for example and without imputing limitation, changing the exponent (2 in the equation above) to a lesser or greater value. Changing the exponent has the effect of increasing or decreasing sensitivity to the extent measured and may have other smoothing effects. Other functions (e.g., f, g, etc.) of mass and position (e.g., Moment of Inertia = Sum(f ($M_i$) * g($R_i$)), etc.) may be used and can be arbitrarily defined in order to emphasize different distribution characteristics. Furthermore, these functions may be manually decided or determined algorithmically. Other methods for assessing distribution can look more directly at descriptive statistics, such as range, median, mode, quartiles, standard deviation, etc.

By reducing degrees of freedom via subset selection, subsequent analyses that use the selected subset can thereby operate on data points that themselves have not been altered. In comparison, other techniques for reducing dimensionality typically change the data itself (e.g., by applying a transform, etc.), such as in the case of principle component analysis (PCA), whereby the raw data points are not available in an unaltered form at the output.

Figure 2:
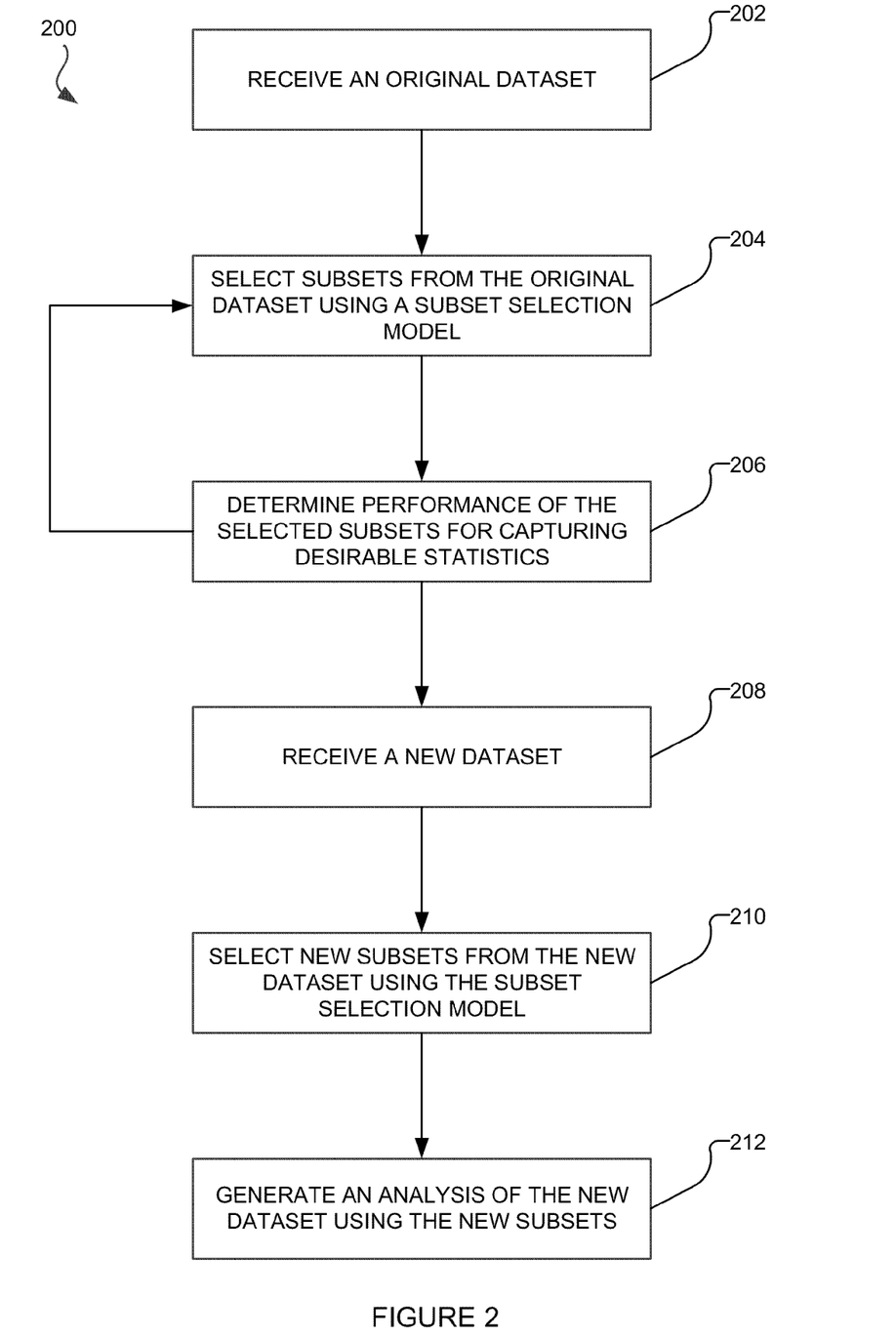
FIG. 2 depicts a method for generating an analysis of a dataset using subset selection model, according to some embodiments.

FIG. 2 depicts a method 200 for processing multivariate data according to the principles discussed above. At operation 202, an original dataset is received (e.g., by a processor, application-specific integrated circuit (ASIC), etc.). The original dataset may be received from a data store in the form of a log file or the like. For example, log data for a fleet of vehicles including a high number of measurements taken at various intervals for various vehicles may be received in order to identify trends in MPG, as discussed above.

At operation 204, subsets are selected from the original dataset using a subset selection model. In some examples, the subset selection model may be determined through user input (e.g.., identifying particular dimensions along which to select the subset). In some examples, the subset selection model may be, in part or in whole, randomly and iteratively determined. Nevertheless, the subset selection model refines the original dataset based on quantitative measures, as discussed above, applied to datapoints of the original dataset and according to a selection of a subset of dimensions along which the datapoints have values.

At operation 206, performance of the selected subsets related to capturing desirable statistics is determined. The quantitative measurements discussed above and elsewhere in the disclosure may be included as part of determining performance. For example, various quantitative and statistical features may be used determine performance such as, for example and without imputing limitation, extent, distribution, volume, variability, scedasticity, various cluster measurements (e.g., distance, density, etc.), and the like.

Furthermore, based on the performance of the selected subsets, method 200 may loop back to operation 204. In effect, method 200 may iterate through subset selections until certain performance thresholds are attained. Once an adequate subset selection has been found, method 200 continues on to operation 208.

At operation 208, a new dataset is received. For example, the new dataset may be live data (e.g., streaming, real-time, near real-time, etc.) or alternative datasets, such as additional data logs or the like.

At operation 210, new subsets are selected from the new dataset using the arrived at subset selection model. Accordingly, the subset selection model may be stored in a local data store or retrieved from a networked, or hosted, data store such as via cloud storage providers or the like. Nevertheless, the subset selection model is selected and applied to the new dataset to select the new subsets.

At operation 212, using the new subsets from the new dataset, an analysis is generated. For example, a trend line analysis of MPG may be generated from the new subset and, because the new subset includes comparable datapoints (e.g., based on the performance measurements, etc.), the trend line analysis may offer higher analytic value, such as more accurate predictions or capture more direct relationships between variables, etc. In some examples, the generated analysis is provided to downstream services to, for example and without imputing limitation, render a graphical user interface (GUI) or the like for a user to navigate and further explore the generated analysis, datapoints, and/or new subsets.

Figure 3:
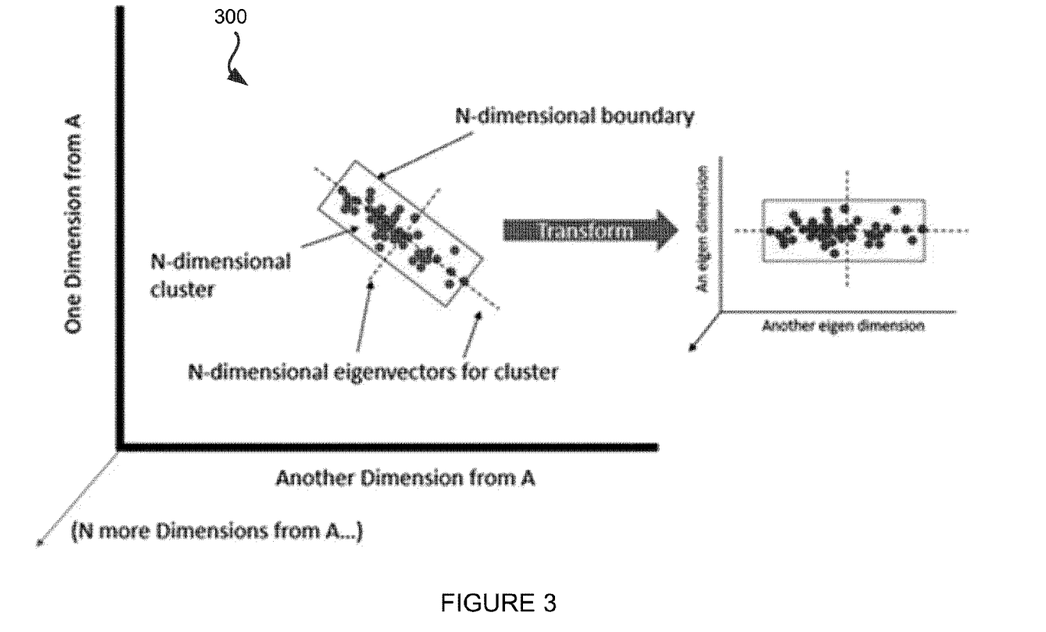
FIG. 3 depicts a bounding process for a dataset using eigenvectors, according to some embodiments.

FIG. 3 depicts a plot 300 illustrating selecting a subset of dimensions and preparing datapoints bounded within the selection for analysis. In particular, a transformation operation is applied to the N-dimensional bounded datapoints to convert the dataset into an interpretable state. Here, the transformation re-orients the datapoints along eigen dimensions; however, it is understood that other transformations may be used that preserve structures and relationships of the originating datapoints.

Figure 4:
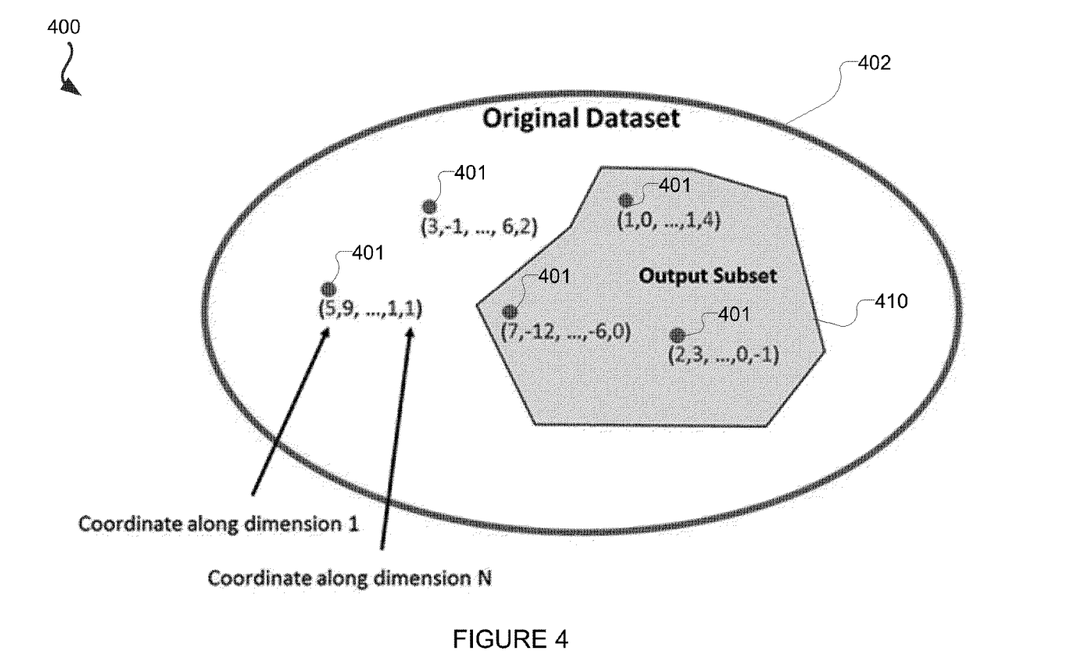
FIG. 4 depicts an illustration of an output subset based on an original dataset, according to some embodiments.

In effect, an original dataset of datapoints, each datapoint representing a collection of coordinates, or values, along N unique dimensions (e.g., signals) can be processed to produce an output of a subset of the datapoints selected to contain coordinates constrained along dimensions defined by A, a subset of N, maintain desirable characteristics along B, also a subset of N, as depicted in FIG. 4 by a data context 400.

In FIG. 4, each datapoint 401 in an original dataset 402 corresponds to an ordered set notated, for example and without imputing limitation, as (5, 9, ..., 1, 1), etc., where the first entry corresponds to a coordinate value along a first dimension and so on, a final $n^{th}$ entry corresponding to a coordinate value along an N dimension. Separately, each of the N dimensions is placed in one of two sets (referred to above as sets A and B). An output subset 410 is a collection of datapoints 401 containing coordinates constrained along dimensions defined by set A and maintain desirable characteristics along dimensions defined by set B or subset S.

There can be situations where analysis of original dataset 402 would benefit from additional context or transformations. In some cases, calculations or context may be added to the original dataset before segmentation and subset definition of sets A and B occur. The additional context, transformations, and/or calculations may, for example, aid in defining constraints or in evaluating desirable characteristics.

For example, an industrial process may include multiple temperatures and flows. It may be desirable to look for constraints on enthalpy, which is not explicitly articulated in the dataset. Enthalpy is a function of temperatures, flows, and other material properties (e.g., context), and so constraints on those measurements or properties might not provide for comparable enthalpy conditions. By adding enthalpy (e.g., a calculated value) or other calculated values to the dataset before segmentation of sets A and/or B, it becomes a potential input for the methodology of this disclosure.

In other cases, adding calculations after segmentation or subset definition of sets A and/or B can be sufficient. For example, having found comparable enthalpy domains, energy might be calculated for respective time periods for those domains. The energy calculation itself need not have been present up front. In either scenario, the calculations/calculated signals may provide for emphasizing certain individual signals at analysis. For example, relationships between different dimensions of the dataset can be emphasized when captured as individual signals and calculated signals.

Segmentation, subset definition, and/or additional calculation and/or context forming, as discussed above, may be performed in a single pass (e.g., single-pass) over an original dataset or in multiple passes (e.g., multi-pass) over the original dataset. In one example, a multi-pass approach includes starting with N dimensional data (e.g., each data point consists of one coordinate in each of N signals). A set A of dimensions to be constrained is first selected. Set A can be a random selection, may be selected with knowledge of the system, or can be an exhaustive subset of N. In general, for N dimensions, there may be approximately $2^N$ possible combinations of A and B segmentation. An m number of sets of multidimensional boundaries (e.g., clusters, etc.) of A dimensions in a training set may then be found.

For each set of boundaries of m sets, the respective boundaries may be applied to the full original data set, an expanded dataset, a different dataset, a streaming dataset, or a combination of the aforementioned datasets. The resulting subset for desirable characteristics in B dimensions may then be evaluated after the respective boundaries are applied. Further processing and analytics may then be performed on subsets of data that results where the set of boundaries exhibit a desirable characteristic in B. These steps can then be iterated over until an analysis of interest is achieved.

In some cases, additional constraints may be applied when selecting a set of A dimensions. For example, boundary tightness and geometry may be adjusted or particularly defined (e.g., the boundary can be oblong and/or angled, such that it captures a non-stationary, but constant, relationship between correlated dimensions), how sets of boundaries (or clusters) can be "blurred" or merged together may be adjusted, or how ordered data is treated.

When applying the boundaries of the m sets, and as seen in FIG. 3, searching the dataset for membership of a datapoint within an n-dimensional boundary can become computationally expensive. In some examples, the computational cost can be reduced by transforming the boundary and datapoints in dataset N to a different coordinate system, and/or applying other transformations such as, for example, linearization, to reduce the computational complexity or datapoint search technique.

Further, if the degrees of freedom, due to constraints on A, are sufficiently reduced, A can be treated as a constant, thereby effectively reducing the dimensionality of the dataset. As a result, the values in A dimensions can be assumed irrelevant and/or ignored, or used as constants in when performing further analysis and/or processing.

If the constraints on A are not as tight, clustering can identify constant (e.g., clustered) relationships, rather than clustered values. In particular, the nature of the clusters and/or boundary geometry may capture many datapoints in a region with a shared behavior, similar to where y ≅ m * x + b, for a significant range of x and the like. As a result, the respective cluster falls around a constant relationship rather than constant values. Where clusters fall around constant relationships, rather than assume A is a constant that can be ignored, values in A can further be used in performing analytics phase and/or additional processing.

The disclosure now turns to one embodiment of the approaches discussed above. It is understood that additional, fewer, and/or modified aspects of the embodiment maybe performed without departing from the spirit or scope of the disclosure.

Given a set of time-series signals (e.g., each signal is a time-ordered set of key/value pairs, where the key is a timestamp and the value is a sensor or measurement value), various dimensions of the signals may be differentiated into subsets. For example, where the signals include vehicle information over time, a subset of dimensions B may be defined as the time dimension. A subset of dimensions A may thus be defined by a set of signals of interest such as, for example, MPG and/or other values sought to be analyzed (e.g., a target signal or signals, etc.).

A superset N is thus in effect the combination of A and B, as defined above. Each signal in A can be divided into a parameterized number of bins, for example, to generate a multidimensional histogram. A smoothing function may then be applied to the histogram, such as a Gaussian filter (e.g., as used in image processing), in order to smooth over highly localized, or rapid, changes in counts per bin. A new set of points X may be defined at the center of bins with a sufficiently large count (e.g., highest counts, counts above a threshold, etc.). In general, each such defined point can be indexed $x_i$. Dimensions in A may then be normalized so points at the centers of respective bins are separated from adjacent points (at the center of their respective bins) by a length of one unit of measurement (e.g., length = 1). Using the normalized dimensions, the distance to every $x_j$ in X from each other $x_i$ in X may then be calculated using a distance metric, such as, for example and without imputing limitation, Euclidean, Manhattan, Chebyshev, etc. For any pair $(x_i, x_j)$ with a calculated distance less than or equal to one measurement unit (or other parameterized value) membership may then be assigned to a common cluster.

A set of clusters is thus defined as a result. It is understood that other clustering methodologies may be used, such as, for example and without imputing limitation, hdbscan, dbscan, k-cluster, k-means, etc. Nevertheless, the clusters can then be ranked by one or more statistical metrics, such as, for example, the total count of original datapoints contained in the cluster. Each cluster is then further processed. For example, (orthogonal) eigenvector decomposition may be used to determine a multi-dimensional rectangular boundary for each respective cluster. The boundary may further have a parameterized tightness. The clusters may then be transformed to dimensions matching the respective (orthogonal) eigenvectors and each in signal in A (e.g., over time) may be searched for when each respective signal falls within the bounds of the transformed boundary. Periods of, for example, time can then be aggregated into a series E according to where signals in A are coincidentally inside respective boundaries. Each time-contiguous segment within E may then be referenced as $E_i$.

Further, each signal in A can be further processed so that a respective signal must be within the bounds of a period of time to qualify as a start of an $E_i$ segment and must be outside the bounds to qualify as a terminal, or end, pint of an $E_i$ segment. In effect, this may address ordered neighbor constraints. E can then be evaluated according to a desired criteria, as discussed above.

For example, and without imputing limitation, a moment of inertia method can be applied. Using the moment of inertia method, each $E_i$ is assigned a weight based on a number of respectively contained datapoints and assigned a position according to a respective center timestamp. The shape of the moment of inertia, based on a function for a fulcrum, for example, from time 1 to time N extending over dimension B, can then be compared to a parabola using a square root of a mean taken from the squared differences across the shape.

Each cluster may then be assigned a rank score based on either or both its respective root mean square (RMS) and descriptive statistics, such as, for example and without imputing limitation, count, extent, distribution, etc. Count and extent respectively denote statistics for a sum total of datapoints and a range of datapoints. Distribution may evaluate a standard deviation of a respective space (e.g., time) between $E_i$ sections in E. Once the descriptive statistics have been determined, a parameterized ranking can be applied to the characteristics to generate a rank score. In one example, rank score is generated by an equation: RankScore = a * count + b * extent + c * distribution.

Each ranked cluster, or selected highly ranked clusters (e.g., based on predetermined thresholds, relative thresholds, etc.), may be further processed and analyzed. For example, continuing the car mileage example discussed above, average MPG for datapoints within each $E_i$, which each $E_i$ may be calculated. In effect, the calculated MPG values assign a key-value pair to the datapoints (e.g., a time-stamp as center of an $E_i$ and a value being an average MPG over the $E_i$). The results (e.g., MPG vs. time) may then be viewed and a different selection of A (from N) may be used to repeat the above processes using, for example, a different signal or set of signals for analysis and compare between each reviewed results to select a preferred analysis.

Figure 5:
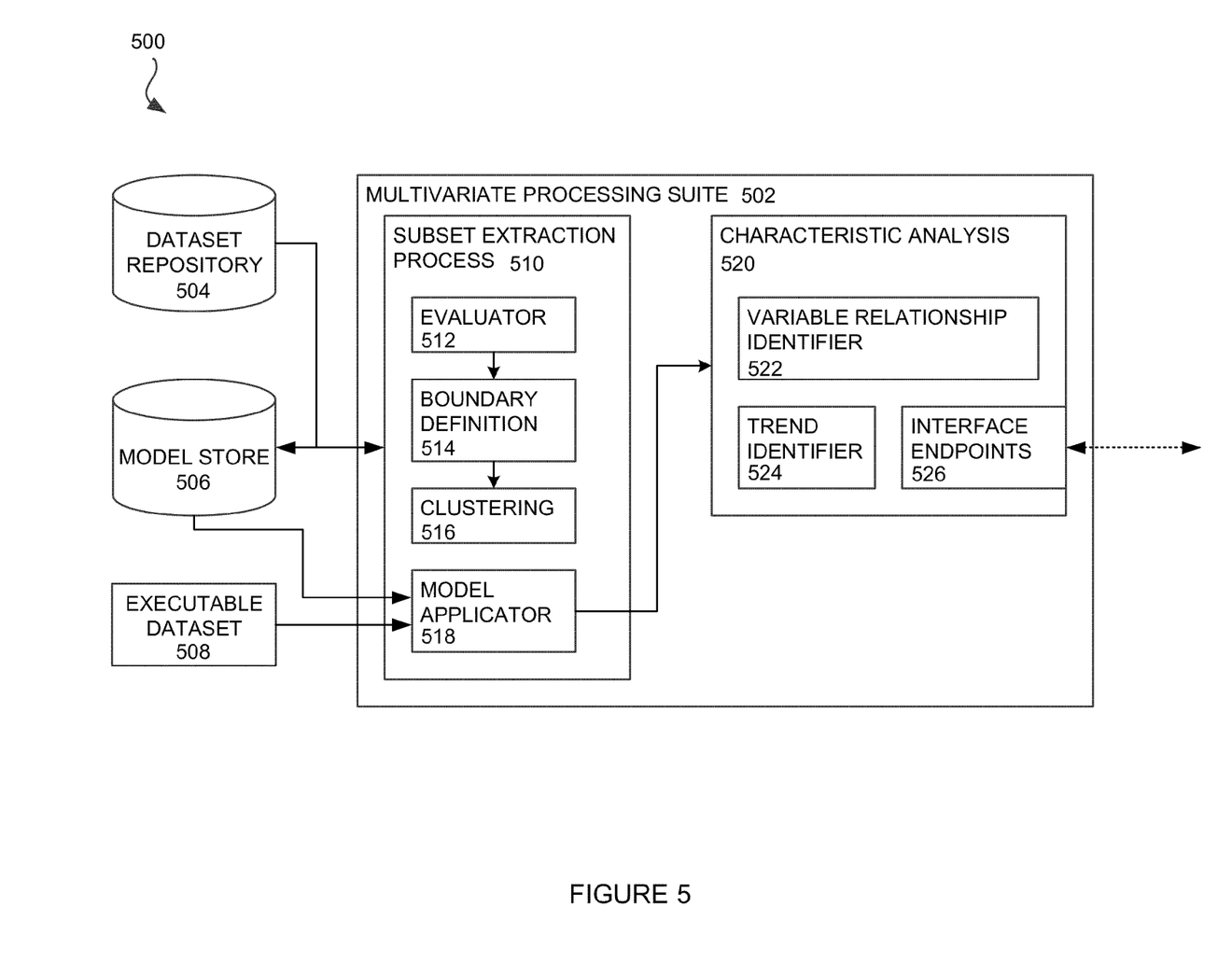
FIG. 5 depicts a system for selecting dimension subsets for analysis from multivariate data, according to some embodiments.

FIG. 5 depicts a system 500 for performing the various methods and operations discussed herein. System 500 is one embodiment and it is understood that variations on system 500 may yet fall within the spirit and scope of the disclosure. Accordingly, system 500 should be understood to be explanatory and not taken to be unduly limiting.

System 500 includes a multivariate processing suite 502 configured, for example, to execute method 200 above. Multivariate processing suite 502 may retrieve data (e.g., an original dataset, etc.) from a dataset repository 504. Dataset repository 504 may be a remote storage solution (e.g., remote server, cloud hosted storage, distributed storage, etc.) or a local data store such as, for example, a local events log repository or the like.

Multivariate processing suite 502 further stores, and retrieves, subset selection models from a model store 506. Model store 506 may be a remote storage solution (e.g., remote server, cloud hosted storage, distributed storage, etc.) or a local data store such as, for example, a device memory or the like.

Multivariate processing suite 502 also communicates receives an executable dataset 508. In particular, executable dataset 508 is processed by multivariate processing suite 502 to generate data subsets for analytic and other downstream processes (e.g., for generating reports, etc.).

Multivariate processing suite 502 includes a subset extraction process 510 and a characteristic analysis service 520. In general, subset extraction process 510 generates subset extraction models from data received from dataset repository 504 and applies the generated subset extraction models to corresponding executable datasets 508. The generated models may be stored in and/or retrieved from model store 506. Characteristic analysis 520 receives extracted subsets from subset extraction process 510 and generates analytics and reporting information based on the extracted subsets (e.g., for rendering in a GUI, etc.).

Subset extraction process 510 includes sub-processes for an evaluator 512, a boundary definition 514, clustering 516, and a model applicator 518. Evaluator 512 determines extracted subset performance based on boundary definition 514, which identifies dimension boundaries to apply to received datasets. Likewise, clustering 516 may assist in determining performance by generating cluster analysis (e.g., cluster density, size, variance, etc.), which may further inform generating boundary definitions 514. When evaluator 512 determines that extract subsets have achieved sufficient performance of subset characteristics (e.g., via thresholds, iteration counts, improvement minimums, etc.), a corresponding extraction model is stored in model store 506 for later retrieval and application to new data.

Model applicator 518 retrieves an extraction model from model store 506 and applies the retrieved extraction model to executable dataset 508. In some examples, such as in the case of streaming datasets, mode applicator 518 may continuously apply the retrieved extraction model to the streaming data. Nevertheless, once the extraction model has been applied, the resultant data is passed to characteristic analysis 520 for further processing.

Characteristic analysis 520 includes a variable relationship identifier 522, a trend identifier 524, and interface endpoints 526. Variable relationship identifier 522 may include various characteristic analytics such as determining volume, extent, variance, skew, scedasticity, etc. of datapoints provided by model applicator 518. Trend identifier 524 likewise may generate various trend analyses such as trend lines and predictions based on either or both of the datapoints from model applicator 518 and relationships from variable relationship identifier 522. Further, characteristic analysis 520 can interface with various downstream processes through interface endpoints 526. For example, characteristic analysis 520 may generate graphical and/or interactive reports through a GUI or the like via interface endpoints 526. In some examples, automation, monitoring, quality control, and other downstream processes may receive trends and variable relationships from characteristic analysis 520 to, for example and without imputing limitation, generate alerts, stage (e.g., in manufacturing, etc) changes, enforce compliance, or the like.

Figure 6:
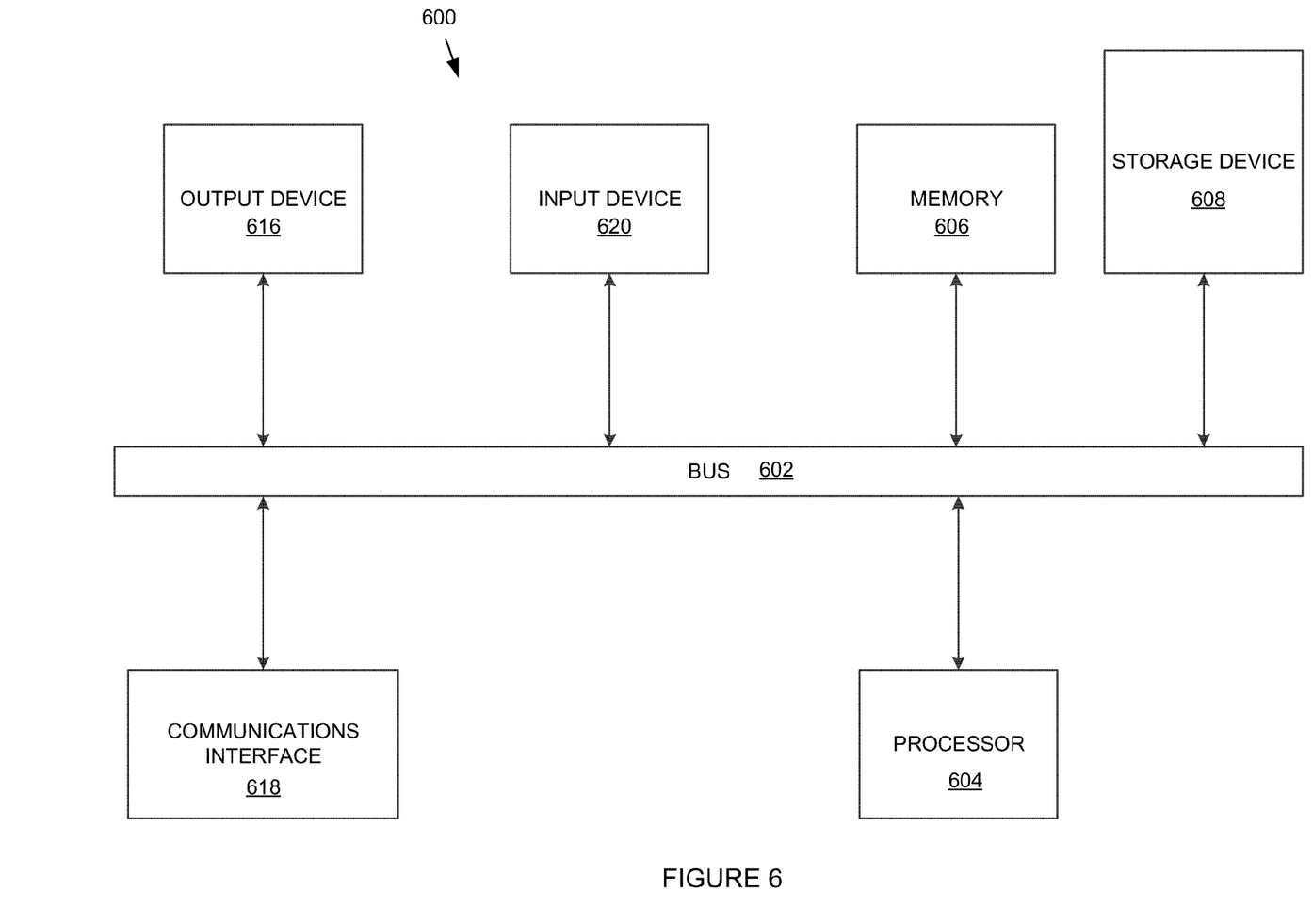
FIG. 6 illustrates a schematic diagram of an example computing system on which the technologies described herein can be executed, according to some embodiments.

FIG. 6 is an example computing system 600 that may implement various systems and methods discussed herein. The computer system 600 includes one or more computing components in communication via a bus 602. In one implementation, the computing system 600 includes one or more processors 604. The processor 604 can include one or more internal levels of cache (not depicted) and a bus controller or bus interface unit to direct interaction with the bus 602. The processor 604 can perform calculations on data, including transformations and operations as discussed above and specifically implements the various methods discussed herein. Main memory 606 may include one or more memory cards and a control circuit (not depicted), or other forms of removable memory, and may store various software applications including computer executable instructions, that when run on the processor 604, implement the methods and systems set out herein. Other forms of memory, such as a storage device 608, may also be included and accessible, by the processor (or processors) 604 via the bus 602.

The computer system 600 can further include a communications interface 618 by way of which the computer system 600 can connect to networks and receive data useful in executing the methods and system set out herein as well as transmitting information to other devices. In some embodiments, the communications interface 618 may receive data via, for example, the internet. The computer system 600 can include an output device 616 by which information is displayed, such as a display (not depicted). The computer system 600 can also include an input device 620 by which information is input. Input device 620 can also be a scanner, keyboard, and/or other input devices for human interfacing as will be apparent to a person of ordinary skill in the art. The system set forth in FIG. 6 is but one possible example of a computer system that may employ or be configured in accordance with embodiments of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magnetooptical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for identifying data relationships across multi-dimensioned data, the method comprising:
    receiving, at a processing device, a multi-dimensional dataset (N) comprising a plurality of datapoints each comprising a plurality of values across a plurality of dimensions (n);
    iteratively performing, by the processing device, the operations of:
        separating the n-dimensional space of the multi-dimensional dataset N into a first set of dimensions (A) and a second set of dimensions (B), wherein the first set of dimensions A and the second set of dimensions B are each subsets of the plurality of dimensions n;
        defining, within the first set of dimensions A, a constraints boundary around a subset (S) of the multi-dimensional dataset N, the constraints boundary reducing a degrees of freedom of the subset S; and
        comparing a quantity of defined characteristics of the subset S over the dimensions in the second set of dimensions B to a threshold value; and
    generating an executable multi-dimensional subset selection model based on the constraints boundary when the quantity of defined characteristics of the subset S over the dimensions in the second set of dimensions B meets or exceeds the threshold value.

2. The method of claim 1, wherein the first set of dimensions A and the second set of dimensions B are predetermined.

3. The method of claim 1, wherein the first set of dimensions A and the second set of dimensions B are determined automatically.

4. The method of claim 1, further comprising:
    determining a tradeoff between the constraints boundary and the quantity of the defined characteristics in the second set of dimensions B;
    wherein the determination is one of an automated process, a manual process, or a combination of automated and manual processes.

5. The method of claim 1, wherein one of multi-dimensional dataset N or subset S is expanded through additional transformations of the dataset.

6. The method of claim 1, wherein subset S comprises ordered data and membership of a datapoint within subset S is one of qualified or disqualified by membership of adjacent points in one of a sequence or clusters.

7. The method of claim 6, wherein qualifying or disqualifying membership of the datapoint within subset S is based on user input.

8. The method of claim 1, wherein subset S is separated by a clustering algorithm operating over the first set of dimensions A.

9. The method of claim 1, wherein subset S is parametrically adjusted to relax or tighten aspects of the constraints boundary.

10. The method of claim 1, wherein constraints boundary is defined to comprise at least a set of pre-selected characteristics.

11. The method of claim 1, wherein the quantity of defined characteristics is quantified, in whole or in part, by one of a count, a weighted or unweighted distribution, a user-defined statistical measure, or an extent of the dataset.

12. The method of claim 1, wherein the degrees of freedom of the subset S are quantified by a function of one of a localization of datapoints, a size of clusters, or a location of clusters.

13. The method of claim 12, wherein the function further includes weighting.

14. The method of claim 12, wherein parameters of the function are adjusted by one of an automatic process, a manual process, or a combination of automatic and manual process.

15. The method of claim 1, wherein at least one dimension of the second set of dimensions B is measured in units of time.

16. The method of claim 1, wherein multiple subsets of the multi-dimensional dataset N are determined, each of the multiple subsets separately evaluated for the defined characteristics in the second set of dimensions B.

17. The method of claim 1, wherein the defined characteristics are inclusive of an entirety of the subset S.

18. The method of claim 17, further comprising transforming the definition of the subset S to execute optimally in a separate system.

19. The method of claim 1, further comprising:
    providing the subset S to a downstream process.

20. The method of claim 19, wherein the downstream process comprises one of a modeling process or an analysis process.

21. The method of claim 19, wherein the downstream process comprises a visualization process, and wherein the subset S is visualized over the second set of dimensions B and the first set of dimensions A are not articulated by the visualization process.

22. The method of claim 1, wherein the subset S is defined through one of an iterative or programmatic determination process.

23. The method of claim 1, wherein the subset S is defined for the multi-dimensional dataset N and wherein the method further comprises storing the definition of the subset S on a memory for application to one of the multi-dimensional dataset N or another dataset.

24. A system for identifying data relationships across multi-dimensioned data, the system comprising:
  one or more processors; and
  a memory comprising instructions to:
    receive a multi-dimensional dataset (N) comprising a plurality of datapoints each comprising a plurality of values across a plurality of dimensions (n);
    iteratively perform, by the processing device, the operations of:
      separate the n-dimensional space of the multi-dimensional dataset N into a first set of dimensions (A) and a second set of dimensions (B), wherein the first set of dimensions A and the second set of dimensions B are each subsets of the plurality of dimensions n;
      define, within the first set of dimensions A, a constraints boundary around a subset (S) of the multi-dimensional dataset N, the constraints boundary reducing a degrees of freedom of the subset S; and
      compare a quantity of defined characteristics of the subset S over the dimensions in the second set of dimensions B to a threshold value; and
    generate an executable multi-dimensional subset selection model based on the constraints boundary when the quantity of defined characteristics of the subset S over the dimensions in the second set of dimensions B meets or exceeds the threshold value.

25. A non-transitory computer readable medium storing instructions executed by one or more processors, the instructions causing the one or more processors to:
  receive a multi-dimensional dataset (N) comprising a plurality of datapoints each comprising a plurality of values across a plurality of dimensions (n);
  iteratively perform, by the processing device, the operations of:
    separate the n-dimensional space of the multi-dimensional dataset N into a first set of dimensions (A) and a second set of dimensions (B), wherein the first set of dimensions A and the second set of dimensions B are each subsets of the plurality of dimensions n;
    define, within the first set of dimensions A, a constraints boundary around a subset (S) of the multi-dimensional dataset N, the constraints boundary reducing a degrees of freedom of the subset S; and
    compare a quantity of defined characteristics of the subset S over the dimensions in the second set of dimensions B to a threshold value; and
  generate an executable multi-dimensional subset selection model based on the constraints boundary when the quantity of defined characteristics of the subset S over the dimensions in the second set of dimensions B meets or exceeds the threshold value.

* * * * *